Nov. 18, 1969   J. F. KIDWELL   3,479,514
METHOD AND MEANS FOR INSPECTING GLASS ARTICLES
Filed Sept. 23, 1966   3 Sheets-Sheet 1
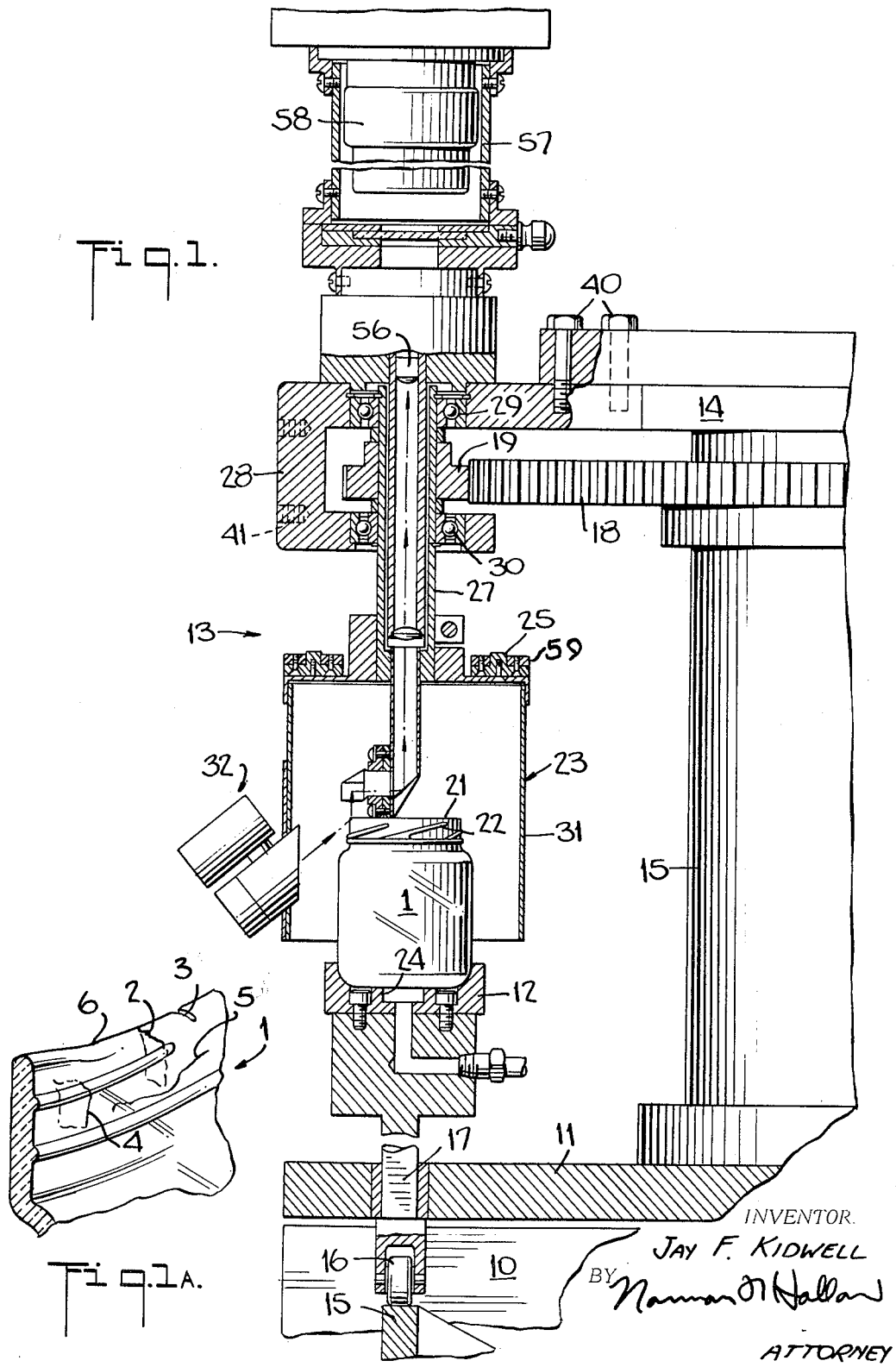
INVENTOR.
JAY F. KIDWELL
BY
ATTORNEY

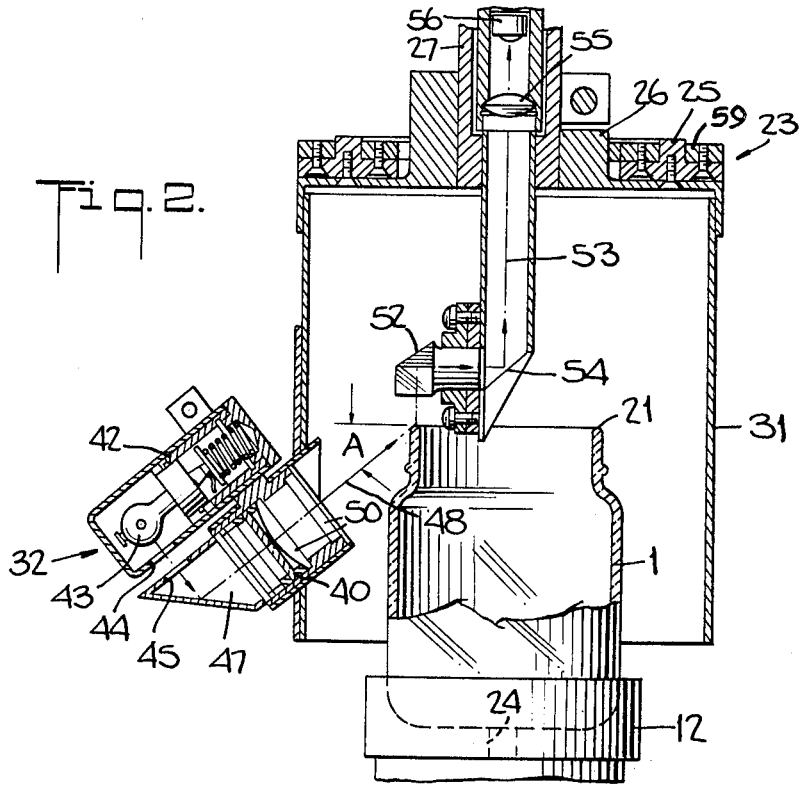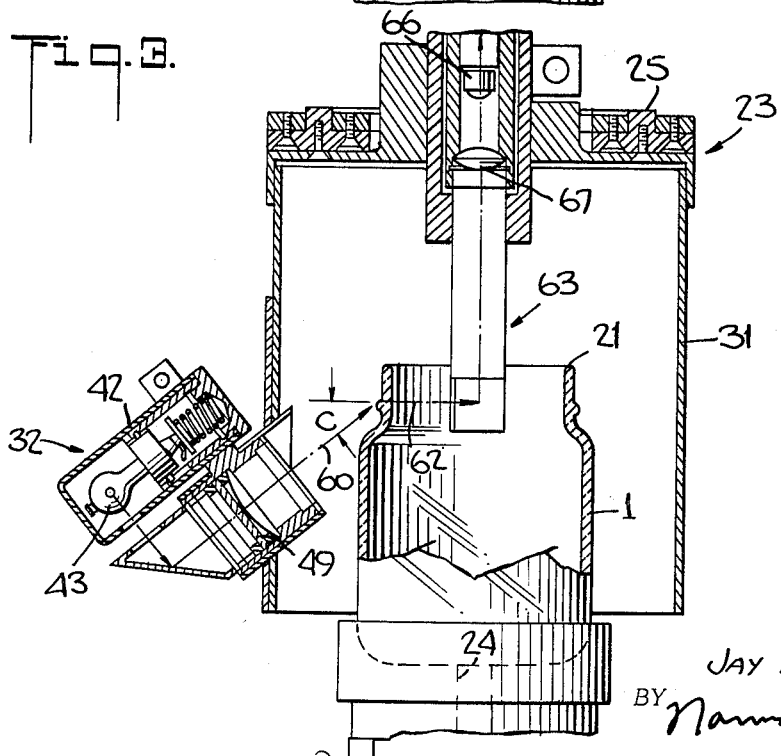

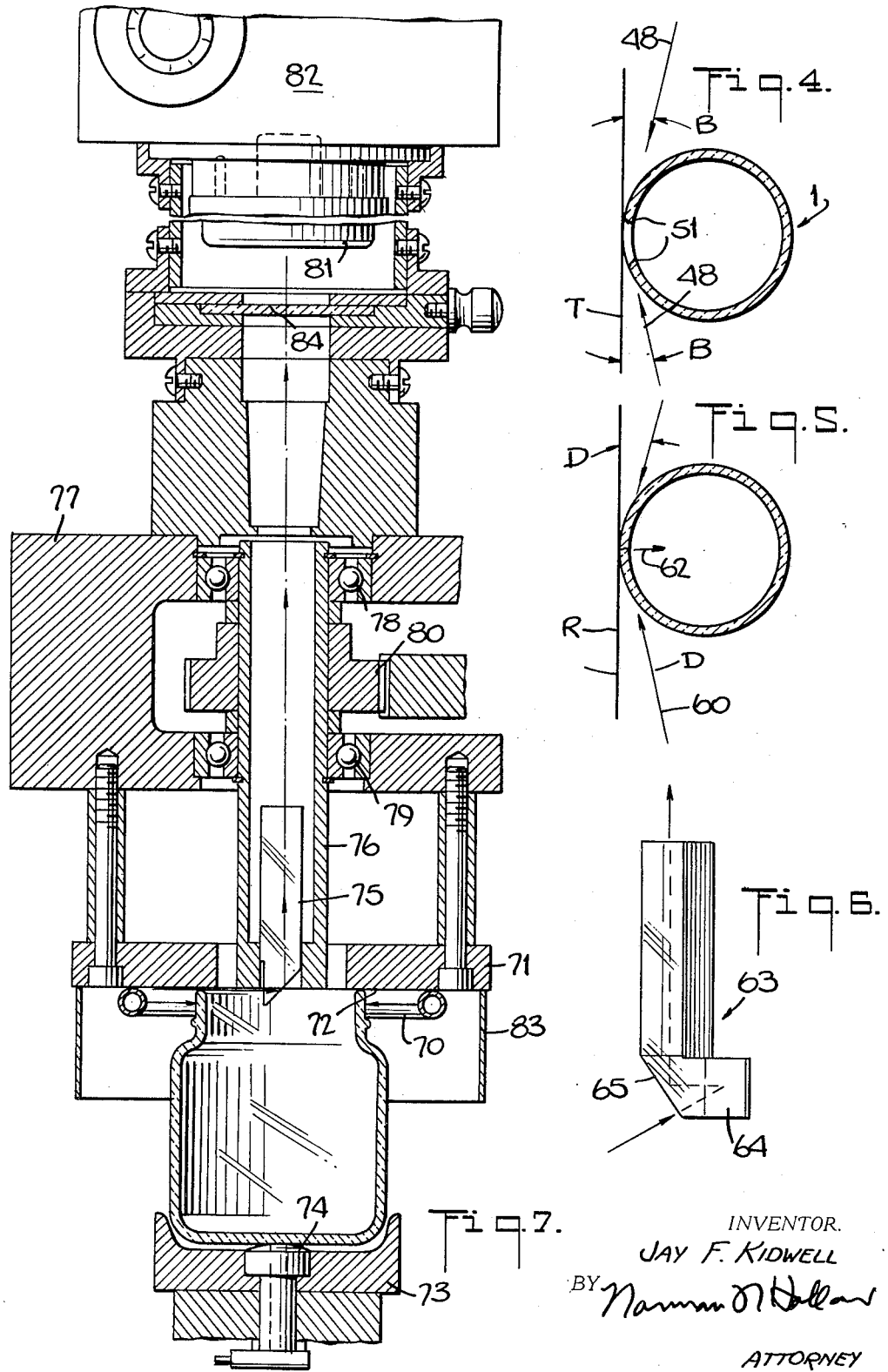

United States Patent Office 3,479,514
Patented Nov. 18, 1969

3,479,514
METHOD AND MEANS FOR INSPECTING GLASS ARTICLES
Jay F. Kidwell, Lancaster, Ohio, assignor to Anchor Hocking Corporation, a corporation of Delaware
Filed Sept. 23, 1966, Ser. No. 581,549
Int. Cl. G01n 21/32; G01b 11/30, 19/60
U.S. Cl. 250—223                                    23 Claims

ABSTRACT OF THE DISCLOSURE

A machine for automatically inspecting glassware. A rotatable inspection head is situated around the upper portion of the glassware and contains the light directing and receiving means. The light is directed inwardly through the glassware and is picked up by the receiving means. A fault beam sensor records defects which are present in the glassware.

---

The present invention relates to the automatic inspection of glassware to detect and reject defective articles and more particularly to an improved method and means for optically scanning hollow glass articles including the lugged or threaded portions as well as other portions of glass containers.

Glass containers are now routinely manufactured or formed at high speeds for use in packaging a variety of products and particularly food products. It is necessary that these containers be carefully inspected for objectionable flaws including defects such as cracks, checks, splits, tears, blisters, and marks as well as warps or dips in the container rims. An inspection rate is desirable which corresponds generally to the production rate of the glass articles to eliminate a build-up of completed articles at the inspecting stations.

At present, such inspection may be done visually or partially or completely by an automatic optical inspection. Certain of the simpler automatic inspections which are directed towards the detection of relatively severe defects or which are done on exposed and generally smooth portions of the containers are now performed satisfactorily by inspecting machines, as for example, the machines described in United States Patents Nos. 3,067,-872, 3,098,564, and 3,098,565 owned by the assignee of the present invention.

Difficulty has been experienced, however, in performing a fully automatic inspection on some glass containers where extremely minute but objectionable faults occur in or near the more complexly shaped portions of the glass containers such as in the area of the finish. This has been particularly troublesome on containers having threads or lugs or protruding beads which interfere with the inspecting light beams and which also have been found to generate objectionable noise levels which mask the desired signals generated by the various objectionable faults.

One example of this type of glass container which presents severe problems, which minimize the value of present automatic inspection machines, is the conventional glass container used for baby foods or similar products and which, due to the nature of the product, must be rigidly inspected. These containers have relatively complex shapes adjacent to their finish portions formed by the container engaging threads.

The present invention provides an improved method and machine to inspect the finish and adjacent portions of these or similar containers and provides distinct and usable control or fault signals generated by defects in such containers for actuating suitable container ejecting apparatus.

The improved method and means has eliminated one significant source of inspection difficulties found in present systems by providing a novel optical scanning system wherein a completed inspection may be made while the inspected container is stationary without being rotated about its vertical axis. In addition, preferred paths for the scanning light beam and preferred light wave lengths are provided to further facilitate inspection of difficult surfaces such as threaded surfaces with a minimum of spurious signal generation or noise and with a maximum and sharply defined control signal being generated by the particular fault being checked for. This provides a signifiacntly improved and high order of discrimination between defects which are objactable and certain blemishes which are not.

In addiiton the improved scanning method and means are useful in a variety of inspections so that the general design is basic to the several inspection heads employed without substantial changes being required in the scanning system optics.

Accordingly, an object of the present invention is to provide an improved method and means for detecting faults in glass articles.

Another object of the present invention is to provide an improved means for automatically and optically inspecting complexly shaped portions of glass articles including threaded portions.

Another object of the present invention is to provide an improved method and means for inspecting the entire circumference of a glass article without article rotation.

Another object of the present invention is to provide improved optical inspection system for inspecting glass articles where the relative motion for the scanning is provided by rotating optical elements and without rotating the articles or the photoelectric pick-off and its associated lens and filter system.

Another object of the present invention is to provide improved means for inspecting the rims of glass articles using an ultraviolet light source.

Another object of the present invention is to provide an optical inspection means for glass articles in which the optical systems are suitable for precise prealignment in a test bench set-up and which are then easily inserted in the inspection machine.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 1 is a side elevational view partially in section illustrating a preferred embodiment of an article inspecting head mounted for use with a rotary article conveyor means;

FIG. 1A is a fragmentary perspective view of a container top illustrating typical defects in exaggerated form;

FIG. 2 is a vertical sectional view of a preferred embodiment of a jar top of finish inspection head in accordance with the present invention;

FIG. 3 is a vertical sectional view of a preferred embodiment of a jar side of finish and shoulder inspection head in accordance with the present invention;

FIG. 4 is a plan view illustrating the preferred light paths for the inspecting beams of the inspecting means of FIG. 2;

FIG. 5 is a plan view illustrating preferred light paths for the light beams of the inspection means of FIG. 3;

FIG. 6 is a detailed side elevational view of a preferred embodiment of a scanning prism for the finish inspecting means of FIG. 3;

FIG. 7 is a vertical sectional view of a preferred embodiment of a jar rim warp and dip inspection means using an ultraviolet light source.

The automatic inspecting method and means of the present invention provides improved inspecting means characterized by the absence of rotation of the inspected article and the use of a more selective optical scanning system. A variety of different defects must be detected by such a system on different portions of the containers. While the improved system is capable of detecting a variety of faults, it has been found most effective to have several different heads with the individual heads adjusted for being particularly sensitive to one or more particular faults.

Three principal embodiments of inspecting heads, in accordance with the present invention, will be described in detail below under appropriate headings.

The first inspecting head is designated as a top finish inspection head. This inspection head is particularly adapted for detecting splits or cracks in the glass at the top of the finish of a container 1 and as illustrated at 2 in FIG. 1A. In addition, this same top finish inspection head also detects marks over the jar finish which are slight vertical dips, slots or grooves as illustrated at 3 in FIG. 1A.

The second embodiment of an inspection head in accordance with the present invention is side finish and shoulder inspection station particularly adapted for detecting splits in the side of the finish of a jar which may extend downwardly from the top of the finish and which also may pass through one or more threads or beads provided in the side of the jar finish. Such a crack in the jar finish is illustrated at 4 in FIG. 1A. This same inspecting head also detects tears which most often take the form of scratches in the jar finish. A typical tear or scratch is illustrated at 5 in FIG. 1A.

The third embodiment of an inspecting head in accordance with the present invention is a rim warp and dip inspection head. This head detects waves or dips along the tops of the jar finish. A dip of this general type is illustrated in exaggerated form at 6 in FIG. 1A.

The several heads are incorporated on a suitable support in an inspection machine so that inspected articles are passed continuously into the machine and successively into inspecting relationship with the several heads. While each head is sensitive to a number of faults, differently arranged optics are used to make each of the various heads particularly sensitive to preselected faults.

FIGS. 1 illustrates generally one suitable means for mounting a series of the inspecting heads to be described herein so that the inspected articles are passed in succession to several inspecting heads. This support includes a suitable base 10 including a rotatably mounted lower turret or dial 11 having a series of articles supporting pads 12 spaced around its circumference. The jars 1 being inspected are fed in the usual manner from a line of jars through an entrance gate which feeds one jar at a time to a pad 12 during the stationary period between intermittent rotary step movements of the dial 11. The dial 11 is intermittently turned a preset fraction of a revolution to advance the pads 12 into inspecting position beneath one of the several spaced inspection heads such as the head 13 illustrated in FIG. 1.

The several inspecting heads are mounted on a fixed support bracket 14 on a machine center post 15 or on fixed bracket adjacent the dial 11 and in position to receive the jars 1 lifted into inspecting position at each station on pads 12 by a lifting means such as the circular cam 15 and related cam rollers 16 and vertical pad support shafts 17.

It is clear that a variety of conveyor means may be provided for intermittently advancing the articles to be inspected to the inspecting heads. The functions of the dial 11, for example, may be performed by a straight conveyor and the inspecting heads may be mounted along the sides of the conveyor. No additional and detailed description of such an article conveyor means is necessary since it will be clear that the inspecting heads to be described herein may operate with a variety of means which will lift the articles being inspected into the inspection positions as illustrated for the several inspecting head embodiments in FIGS. 1, 2, 3 and 7 herein.

A rotary drive for the moving portions of the optical systems as described more fully in the following detailed descriptions may be conveniently provided by the common drive gear 18 (FIG. 1) driven by a central drive shaft (not shown) for engaging pinions 19 coupled to the rotating portions of the inspecting heads.

Top finish inspection head

A preferred embodiment of the rim or top finish inspection head will now be described with particular reference to FIGS. 1 and 2.

These figures illustrate a glass jar 1 having a generally circular rim 21 with a series of cap engaging threads or lugs 22 formed below the rim 21. The optical system of this head is particularly suited for the detection of splits or cracks in the jar rim such as the crack 2 illustrated in FIG. 1A or a mark 3. A jar 1 is shown which has been moved into inspecting position under a generally cylindrical inspecting hood 23 on a jar support or pad 12.

After being moved to this inspecting position either by vertical movement of the pad 12 or the hood 23, or both, the jar 1 remains stationary and the jar rim 21 is scanned around its entire circumference by rotary movement of the hood. A vacuum outlet is illustrated at 24 for holding the jar 1 in position on the pad 12.

As is illustrated in FIG. 1, the hood 23 comprises a top 25 including a shaft engaging flange 26 which is connected to a vertical hollow shaft 27 rotatably mounted on the head support member 28 in spaced bearings 29 and 30. The depending side walls 31 which define an enclosed jar inspecting cavity are attached to the top 25 of the hood and an inspecting light beam source 32 is attached to a lower portion of the side walls 31 for movement therewith.

The hood 23 is rotated at a relatively high rate during the optical scanning which will be described below. A preferred embodiment of the hood drive includes the pinion 19 mounted on the hood support shaft 27 and driven by a suitable electric motor through a drive system which includes the large drive gear 18. A satisfactory speed of rotation of the hood 23 in the inspecting system of this invention has been found to be about 1200 r.p.m. However this speed is not critical and the system has operated satisfactorily at reduced speeds and at speeds up to 3600 r.p.m.

One significant advantage of the present inspecting system is the use of the rotating hood and its related objects for performing the scanning since this sub-assembly may be dynamically balanced and since it will then remain in balance and will be independent of variations in container shape and weight such as cause imbalance in systems relying on rotation of the inspected article. In addition the hood may be continuously rotated as the jars 1 are moved into inspecting positions so that no start or stop systems are required.

As already indicated, the individual inspecting heads 13 may be attached to a central support 15 on a rotary machine by suitable bolts 40 or it may be mounted adjacent to other suitable conveyors on other brackets and may be coupled by means of bolts engaging tapped bolt holes 41. These same tapped bolt holes 41 are particularly useful in temporarily attaching inspecting head 13 to a bench stand or support where the individual head may be dynamically balanced or optically aligned in a convenient test set-up outside of the machine. Thereafter, it is only necessary to move the inspecting head 13 into position on the machine as the balancing and optical alignments will be unaffected by the attaching of the head 13 to its support means in the inspecting machine.

The optical scanning system including the fault signal detecting system will now be described. The top finish inspection head, as indicated above, optically scans the upper portion of the container rim to detect cracks or splits 2 and marks 3 (FIG. 1A) occurring in this area. The preferred direction for the inspecting beam and one which has resulted in a significant decrease in noise signals, both from finish irregularities and threads, provides an upwardly slanted scanning beam generated by the light beam source 32 mounted on the lower portion of the inspecting head side 23 walls 31.

A preferred embodiment of this source is illustrated in FIG. 2. A suitable housing 42 mounts a light source 15 which may be visible white light. A lamp 43 is positioned within the housing 42 to direct a beam of light through a first beam defining aperture 44 in the lamp housing 42 and a second generally similar aperture 45 in the lens and filter housing 46. A quartz prism 47, which transmits a wide spectrum of light, redirects the light beam at a predetermined inspecting angle with respect to the plane of the jar 1 rim. This beam 48 formed by the apertures now passes through a blue pass filter 49. This filter transmits light in the 440 m$\mu$ band. This is a blue-green light which has been found to have a low surface reflectivity so that a minimum noise signal is generated by surface reflections during the scanning operation. This beam of blue light is further focused and narrowed by a regular columnating and cylindrical lens system 50 and the beam 48 is directed to impinge at the outer edge of the container top finish at a preferred angle A with the plane of the container rim of 39°±2°. This scanning light beam 48 when viewed in plan (FIG. 4) preferably forms an angle B of 11°±2° with respect to a tangent T drawn at the inspecting position. A beam thus angled has been found to provide substantial error signals in a generally vertical direction when the inspecting beam strikes either a rim split or a rim mark of the type further described above.

Collector rings 59 on the top 25 of the hood 23 are provided for coupling a source of voltage to the lamp 43 on the rotating hood 23.

FIG. 4 which is a plan view illustrating the preferred direction of the inspecting light beam 48 in the plane of the container rim shows two generally opposite inspecting beams 48 positioned at an angle B to a rim tangent T. Two successive top rim inspecting heads are preferably used which differ only in the opposite positioning of the inspecting beam 48 in the two angular relations illustrated in FIG. 4. The two heads have been found preferable as the splits and marks for which this head is particularly adjusted have been found to vary in both directions from a purely radial direction. In other words, certain of the cracks or marks occupy a position illustrated by the crack 51 whereby they are oriented more nearly parallel to the lower inspecting beam 48 (FIG. 4). A crack or mark thus oriented is seen to be more nearly at right angles to the upper inspecting beam 48. The use of the two positions therefore insures that objectionable cracks or marks will be detected at one station or another since cracks or splits which may be generally in alignment with one beam will be more nearly at the desired right angle position in respect to the differently positioned beam at the second inspecting position.

Fault signal to noise ratios of three or four to one have been obtained with such an optical system even where the errors being detected are extremely minute and almost invisible to the naked eye and of an order which formerly would be missed in automatic inspections. This high signal to noise ratio is obtained at the jar rim and is then maintained by an error signal receiving system which preferably includes a scanning prism 52 positioned, as illustrated, immediately above the jar 1 rim and aligned to redirect the fault signal 53 to a vertical prism 54 which transmits the fault signal 53 through a stationary ocular lens 55 to a photoelectric diode sensor 56. A suitable and detachable enclosure 57 is provided on each inspection head above the sensor element 56 to house or support an amplifier 58 for the fault signal generated at the sensor 56. Such well known amplifiers will provide suitable electrical signals at their outputs for operating a reject signal storing or container removing means of which a variety of known systems are available to subsequently remove containers from the inspecting machine which have been found to be defective. Such systems are described, for example, in the above mentioned United States patents.

Side finish and shoulder inspection station

Another embodiment of the inspecting head will now be described which is particularly suited for detecting splits which may extend downwardly from the top finish and which may pass through a portion of the side finish which includes one or more threads. This station also is particularly suited for detecting an additional defect known as a tear. Typical splits and tears as detected by this head, and as further described above, are illustrated at 4 and 5 in FIG. 1A.

A preferred embodiment of this head is illustrated in FIG. 3. The head has a number of elements in common with the above described top finish inspection station and the hood 23 and its support and drive means may be identical to that described including the hood side walls 31 mounting an inspecting light beam source 32 and with the hood 23 being rotated by a drive means similar to that already described. A support pad 12 is provided which may also include a suitable vacuum inlet 24 for engaging the inspected article. An inspecting light beam in the blue-green range of about 400 m$\mu$ is used at this station for the reasons already indicated and as the low noise signal generated by a light beam of this wave length is of particular value for this inspection. A light beam 60 of small cross section is generated by the source 32 which is similar to that already described in connection with FIG. 2. This light source, being mounted on the hood 23, provides a rapidly rotating scanning beam 60 which impinges upon the side of the jar finish.

In order to provide for a scanning of the entire area between the top of the finish and the upper portion of the jar shoulder, relative vertical movement is preferably provided between the light beam 60 and the jar 1 finish. While this movement can be provided for by a movement of the inspecting hood 23, it is most readily provided by a slow additional lifting of the pad 12 during the scanning such as through the use of an auxiliary cam wheel as illustrated generally at 61 in FIG. 3.

The combined rotation of the hood 23 and vertical movement of pad 12 permits a scanning of the side of the jar finish including the portion with threads 22 and an additional portion of the jar top below the threaded portion.

A preferred inspecting angle for the inspecting beam 60 with respect to the plane of the jar rim has been found to be where the angle C as illustrated in FIG. 3 is about 39°±2°. The angle of the inspecting beam 60 in the plane of the jar rim and as illustrated in FIG. 5 preferably forms an angle D with respect to a rim tangent R of about 15°±2°.

For the same reasons as described above, two successive stations are preferably provided with the positions of the inspecting beam 60 with relation to the tangent beam R being reversed as shown to insure detection of cracks varying in both directions from a generally radial direction. The heads employed at the successive stations are similar with respect to one another except for the angular difference illustrated in FIG. 5. The cracks and tears being checked at these stations have been found to produce a strong fault signal 62 directed generally inwardly of the container 1 being inspected along a path as illustrated in FIG. 5. This fault signal 62 is received and redirected along a generally vertical path by a light directing means positioned partially within the jar 1.

A preferred embodiment of this device comprises a unitary quartz double prism 63 (FIGS. 3 and 6) in which a first prism portion 64 directs the fault signal 62 along a generally horizontal path and a second prism portion 65 which redirects this beam vertically to a photoelectric diode sensor 66 through a stationary ocular lens 67. The sensor 66 is connected to a suitable signal generating means mounted at the top of the head as already described above for the top finish inspection head.

Rim warp and dip inspection station

This inspection station is provided to detect what are known as warps or dips in the finish of containers. A dip or warp is illustrated, for example, in exaggerated form at 6 in FIG. 1A. These waves or uneven surfaces at the rims of containers are objectionable when they exceed a critical amount as they tend to prevent a proper seal between the jar finish and a closure cap gasket. While certain devices have been used previously to detect these imperfections, an improved inspecting means of this nature is provided which will precisely discriminate between objectionable and unobjectionable amounts of warp or dip.

A preferred embodiment of such a discriminating warp and dip detector is illustrated in FIG. 7.

This detector takes advantage of the fact that the regular flint glass of which containers are made is opaque to ultraviolet radiation i.e. radiation in the 253 m$\mu$ band.

The ultraviolet inspection system used includes an annular ultraviolet light source 70 mounted immediately below a jar finish staging or gauge plate 71. The gauge plate has a lower flat gauging surface 72. A jar supporting pad 73, generally similar to pads 12 described above, presents the jar 1 to the detecting station and presses the jar finish tightly against the lower surface of the gauging plate 71.

While warps or dips are objectionable since they interfere with proper sealing, a slight tilt in the plane of an otherwise flat finish is not objectionable. For this reason, the pads 73 in a machine including this head include a central support button 74 which permits the jar to rock so that the jar finish accommodates itself against the lower flat surface 72 of the gauging plate 71. This button may be raised at this head only by a suitable supplemental cam or cam wheel.

When the jar 1 has been moved into this position, the only ultraviolet light which passes into the center of the jar 1 necessarily is that radiation which passes through dips or warps in the jar finish since the glass rim otherwise acts as a barrier to the ultraviolet light.

Any ultraviolet light passing through such faults is received by a scanning prism 75 positioned to redirect the ultraviolet rays penetrating to the center of the jar vertically towards a detecting apparatus mounted at the top of the head. In order to scan the entire circumference of the jar and to pick up all rays which may be passing through faults, the scanning prism is mounted on a rotatable support shaft 76 on the head support member 77 in spaced bearings 78 and 79. The prism 75 is rotated by means of a pinion 80 which is coupled to a suitable drive system such as that described above for the other heads. The head support member 77 is attached to a suitable portion of an inspection machine such as the support members 14 and 15 described above for the top finish inspection station and also may be attached to a test bench stand for a preliminary optical and mechanical adjustment as also described above.

The ultraviolet fault signals passing through to the scanning prism 75 and which are redirected vertically thereby pass through an ultraviolet filter which removes any incidental visible light and are then picked up by an ultraviolet photo-multiplier tube 81 mounted at the top of the head and coupled to a suitable signal amplifier 82.

This arrangement, including the photo-multiplier tube, provides a sensitive and relatively linear signal response for the fault signals picked up by the rotating scanning prism and permits a precise adjustment of the level of error signals to be used in activating the container rejection equipment. It has been found, for example, that a conventional photo-multiplier and amplifier system thus employed may be adjusted to discriminate between rim dips of 8 and 9 on the basis of a scale in which the maximum probable rim dip depth was given a value of 10. In other words, with such an arbitrary scale, the head would reject all jars having rim dips with a depth or area of 9 or more but would pass jars having readings of 8 or less.

This inspecting system using an ultraviolet light source and the above described filter together with a suitable cylindrical radiation shield 83 around the jar 1 is extremely reliable and sensitive due to both the photomultiplier system used and to the insensitiveness of the entire system to any incidentally present visible light which is either shielded or filtered from the system as described.

This inspecting head may be used in the general arrangement described above either in advance of or after the other finish inspection heads already described.

As described in some detail above the inspecting system in accordance with the present invention incorporates inherent advantages over prior devices of this general type in connection with the stationary positioning of the jars and in the cooperating arrangement of the optical inspecting system including the light beam paths and the preferred wave lengths. A series of tests of the devices have indicated that these advantages are actually obtained. These tests were performed by taking a relatively large number of jars which had been passed through present automatic inspection machines and which had been indicated for one reason or another as being acceptable by these machines. When this group of containers was run through testing heads in accordance with the present invention, a significant number of jars were rejected which upon close visual examination were found to contain objectionable faults including splits, marks, tears and rim dips of the nature described above. While numerically these containers might represent a small portion of the regular output of glass forming apparatus, it is particularly desirable that substantially 100% of objectionable containers be rejected where food products such as baby foods are involved. Additional tests were made in a first group of jars having known defects and which were rejected by other inspecting machines and which were mixed for the test with a second group of jars having objectionable defects but which were passed by prior inspecting machines. When these mixed groups of jars were inspected by the inspection heads of this invention, substantial increases in overall selection efficiency were noted with all of the first group being rejected and with a substantial proportion of the second group being rejected.

It will be seen that an improved optical inspecting method and apparatus have been provided for glass containers or similar articles. Several important advantages, as disclosed more fully above, have been realized and particularly the ability of the system to select objectionable defects and to pass jars having minor flaws which are unobjectionable. As already indicated, these improved results are obtained in part by the improved jar handling wherein the jars are held substantially stationary during inspection and where a cooperating scanning action is obtained by an improved rotating optical system. Improvements have also resulted from the particular alignments of the paths of the light beams and from the light wave lengths used which provide an improved signal to noise ratio and adapt the system for the inspection of critical areas of typical glass containers including threaded portions of the jar tops or finishes.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. Apparatus for inspecting the top of the rim of a hollow glass container for variations from a flat plane comprising the combination of an annular lamp for directing ultra-violet light inwardly against an annular zone at said rim and mounted in a position outwardly of the container, a container support, a gauging member having a flat rim engaging surface and being impervious to ultra-violet light for blocking the beam at flat portions of the rim, a fault signal beam receiving and directing means including a narrow-band ultra-violet pass filter positioned inwardly of said rim for receiving and directing ultra-violet light passing through rim variations, means for rotatably mounting said receiving and directing means for rotation about a generally vertical axis including a hollow shaft having beam transmission means positioned therein for directing the ultra-violet light upwardly to a photo-multiplier, a photo-multiplier ultra-violet sensor, and means for mounting said sensor in position above said shaft for receiving ultra-violet fault signal beams from said receiving and directing means.

2. Apparatus for inspecting an annular zone at the upper portion of a hollow glass article comprising the combination of means for forming a beam of light for scanning the annular zone of the glass article, a rotatably mounted support for said beam forming means positioned for moving said beam forming means in a circular path around said article, said beam forming means including means for directing the beam inwardly and upwardly onto said zone, a fault signal beam receiving and directing means, means for rotatably mounting said receiving and directing means for rotation in synchronism with said light beam forming means, a fault signal beam sensor, and means for mounting said sensor in position to receive fault signal beams from said receiving and directing means.

3. The apparatus as claimed in claim 2 in which said beam of light has a wave length limited to the blue-green band.

4. The apparatus as claimed in claim 2 in which said beam of light has a wave length of about 440 mμ.

5. The apparatus as claimed in claim 2 in which said beam of light forms an angle of about 39° with the plane of the rim and about 11° with a tangent to the rim and in the plane of the rim.

6. Apparatus for inspecting the upper portions of hollow glass articles comprising the combination of a hood, means for rotatably mounting said hood for rotation about a generally vertical axis, a light source mounted on said hood for rotation therewith around a circular path, said light source including beam forming means for forming a relatively narrow scanning beam and for directing said beam along an inwardly and upwardly directed path within said hood, and means for positioning the article at least partially within said hood with an annular portion of its upper surface exposed to the beam.

7. Apparatus for inspecting an annular zone including projecting cap engaging members at the rim of a glass container comprising the combination of means for forming a beam of light for scanning the annular zone of the container, a rotatably mounted support for said beam forming means positioned for moving said beam forming means in a circular path around said article, said beam forming means including means for shaping said beam and directing it inwardly and upwardly onto said zone for creating fault signal beams having an upwardly directed component, a fault signal beam receiving and directing means, means for rotatably mounting said receiving and means for rotation in synchronism with said light beam forming means, a fault signal beam sensor, and means for mounting said sensor in position to receive fault signal beams from said receiving and directing means.

8. The apparatus as claimed in claim 7 in which said beam of light has a wave length of about 440 mμ.

9. The apparatus as claimed in claim 7 in which said beam of light has a wave length of about 440 mμ.

10. The apparatus as claimed in claim 7 in which said beam of light forms an angle of about 39° with the plane of the rim and about 15° with a tangent to the rim and in the plane of the rim.

11. Apparatus for inspecting the top of the rim of a hollow glass container for variations from a flat plane comprising the combination of means for directing a beam of ultra-violet light inwardly against an annular zone at said rim, a gauging member having a flat rim engaging surface and being impervious to ultra-violet light for blocking the beam at flat portions of the rim, a fault signal beam receiving and directing means positioned inwardly of said rim for receiving and directing ultra-violet light passing through rim variations, a fault signal beam sensor, and means for mounting said sensor in position to receive fault signal beams from said receiving and directing means.

12. Apparatus for inspecting the top of the rim of a hollow glass container for variations from a flat plane comprising the combination of an annular lamp for directing ultra-violet light inwardly against an annular zoine at said rim, a gauging member having a flat rim engaging surface and being impervious to ultra-violet light for blocking the beam at flat portions of the rim, a fault signal beam receiving and directing means positions inwardly of said rim for receiving and directing ultra-violet light passing through rim variations, an ultra-violet sensitive fault signal beam sensor, and means for mounting said sensor in position to receive fault signal beams from said receiving and directing means.

13. The apparatus as claimed in claim 12 which further comprises a narrow band ultra-violet pass filter at said sensor.

14. Apparatus for inspecting the top of the rim of a hollow glass container for variations from a flat plane comprising the combination of an annular lamp for directing ultra-violet light inwardly against an annular zone at said rim, a gauging member having a flat rim engaging surface and being impervious to ultra-violet light for blocking the beam at flat portions of the rim, a fault signal beam receiving and directing means positioned inwardly of said rim for receiving and directing ultra-violet light passing through rim variations, means for rotatably mounting said receiving and directing means for rotation about a generally vertical axis, a photo-multiplier ultra-violet sensor, and means for mounting said sensor in position to receive ultra-violet fault signal beams from said receiving and directing means.

15. The apparatus as claimed in claim 14 which furthere comprises a narrow band ultra-violet pass filter at said sensor.

16. A method of inspecting a glass article comprising the steps of placing said article in a predetermined position, moving a relatively narrow scanning light beam having an inwardly and upwardly directed path around said article whereby said light beam impinges on a closed path around said article, rotating a light beam receiving and directing element in synchronism with the moving light beam for receiving and directing light re-directed by faults in said article, and positioning a light sensing means for receiving light from said element.

17. A method of inspecting the rim portion of a glass container having cap engaging projections comprising the steps of placing said article in a predetermined position, forming and moving a relatively narrow scanning light beam having an inwardly and upwardly directed path around said article whereby said light beam impinges on a closed path around said container rim portion, rotating a light beam receiving and directing element in synchronism with the moving light beam for receiving and directing light re-directed by faults in said rim portion, and positioning a light sensing means for receiving light from said element.

18. The method as claimed in claim 17 in which said beam of light is formed to have a wave length limited to the blue-green band.

19. The method as claimed in claim 17 in which said beam of light is formed to have a wave length of about 440 m$\mu$.

20. The method as claimed in claim 17 in which said beam of light forms an angle of about 39° with the plane of the rim and about 11° to 15° with a tangent to the rim and in the plane of the rim.

21. A method of inspecting the rim of a glass container for flatness comprising the steps of placing said article in a predetermined position, exposing the outer edge of the rim to an ultra-violet light, blocking the passage of the ultra-violet light into the container over flat portions of the rim, and measuring the amount of ultra-violet light passing over remaining portions of the rim.

22. The method as claimed in claim 21 which further comprises the step of filtering the ultra-violet light prior to measuring its amount.

23. The method as claimed in claim 21 which further comprises the step of scanning the inner edge of the rim for measuring the ultra-violet light passing over incremental portions of the rim.

References Cited

UNITED STATES PATENTS

| | | | |
|---|---|---|---|
| 2,735,017 | 2/1956 | Beard et al. | 250—223 X |
| 2,868,061 | 1/1959 | Fedorchak et al. | 250—223 X |
| 3,328,000 | 6/1967 | Rottmann | 88—14 X |
| 3,349,906 | 10/1967 | Calhoun et al. | 209—111.7 |

WALTER STOLWEIN, Primary Examiner

U.S. Cl. X.R.

209—111.7; 356—240